(12) United States Patent
Takahashi et al.

(10) Patent No.: US 11,122,507 B2
(45) Date of Patent: Sep. 14, 2021

(54) USER DEVICE FOR DETECTING RADIO LINK FAILURE IN ENHANCED COVERAGE MODE

(71) Applicant: NTT DOCOMO, INC., Tokyo (JP)

(72) Inventors: Hideaki Takahashi, Tokyo (JP); Wuri Andarmawanti Hapsari, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 4 days.

(21) Appl. No.: 15/773,300

(22) PCT Filed: Nov. 2, 2016

(86) PCT No.: PCT/JP2016/082651
§ 371 (c)(1),
(2) Date: May 3, 2018

(87) PCT Pub. No.: WO2017/078090
PCT Pub. Date: May 11, 2017

(65) Prior Publication Data
US 2018/0324702 A1    Nov. 8, 2018

(30) Foreign Application Priority Data
Nov. 5, 2015   (JP) .............................. JP2015-217958

(51) Int. Cl.
| | |
|---|---|
| *H04W 52/02* | (2009.01) |
| *H04W 24/10* | (2009.01) |
| *H04W 48/16* | (2009.01) |
| *H04B 17/382* | (2015.01) |
| *H04B 17/318* | (2015.01) |
| *H04W 76/18* | (2018.01) |

(Continued)

(52) U.S. Cl.
CPC ...... *H04W 52/0245* (2013.01); *H04B 17/318* (2015.01); *H04B 17/382* (2015.01);
(Continued)

(58) Field of Classification Search
CPC ............. H04W 52/143; H04W 52/346; H04W 52/0241; H04W 52/0245; H04W 4/70;
(Continued)

(56) References Cited

U.S. PATENT DOCUMENTS

| | | |
|---|---|---|
| 2011/0274040 A1 | 11/2011 | Pani et al. |
| 2014/0098761 A1 | 4/2014 | Lee et al. |

(Continued)

FOREIGN PATENT DOCUMENTS

| | | |
|---|---|---|
| JP | 2013-520103 A | 5/2013 |
| WO | 2015/116870 A1 | 8/2015 |

OTHER PUBLICATIONS

Office Action issued in Japanese Application No. 2018-214675; dated Sep. 10, 2019 (7 pages).
(Continued)

*Primary Examiner* — Peter Chen
(74) *Attorney, Agent, or Firm* — Osha Bergman Watanabe & Burton LLP (57) ABSTRACT

An object is to provide a user device and a radio communication method that are capable of appropriately detecting radio link failure (RLF) even when an enhanced coverage mode is in operation. UE (200) includes CE level setting unit (230) that sets, when the UE is set in the enhanced coverage mode, a reception quality threshold (Qin/Qout) of a reference reception power level (RSRP/RSRQ) specified for CE level, and a radio link monitoring unit (240) that executes radio link monitoring based on the set reception quality threshold. The CE level setting unit (230) sets, regardless of whether the UE (200) is set to any CE level or not, a reception quality threshold specified for the maximum CE level.

2 Claims, 6 Drawing Sheets

(51) Int. Cl.
*H04W 24/08* (2009.01)
*H04W 48/08* (2009.01)
*H04W 88/02* (2009.01)
*H04W 28/02* (2009.01)

(52) U.S. Cl.
CPC .......... *H04W 24/08* (2013.01); *H04W 24/10* (2013.01); *H04W 48/16* (2013.01); *H04W 52/0241* (2013.01); *H04W 76/18* (2018.02); *H04W 28/0268* (2013.01); *H04W 48/08* (2013.01); *H04W 88/02* (2013.01)

(58) Field of Classification Search
CPC ..... H04W 24/02; H04W 24/08; H04W 24/10; H04W 74/0833; H04W 48/08; H04W 48/12; H04W 48/16; H04W 72/042; H04W 72/0413; H04W 72/0446; H04W 88/02; H04W 88/08; H04W 76/18; H04W 28/0268; H04B 17/309; H04B 17/318; H04B 17/382
See application file for complete search history.

(56) References Cited

U.S. PATENT DOCUMENTS

| | | | |
|---|---|---|---|
| 2015/0085717 A1* | 3/2015 | Papasakellariou | H04L 5/14 370/280 |
| 2015/0271763 A1 | 9/2015 | Balachandran et al. | |
| 2017/0171764 A1* | 6/2017 | Dimou | H04W 4/70 |

OTHER PUBLICATIONS

Extended European Search Report issued in the counterpart European Patent Application No. 16862150.6, dated May 21, 2019 (10 pages).

Notification of Reasons for Refusal issued in counterpart Japanese Patent Application No. 2017-548822, dated Aug. 14, 2018 (7 Pages).

International Search Report issued in PCT/JP2016/082651 dated Jan. 10, 2017 (4 pages).

Written Opinion of the International Searching Authority issued in PCT/JP2016/082651 dated Jan. 10, 2017 (6 pages).

Nokia Networks; "RLM/RLF for Rel13 low complexity UE or/and UE in EC mode"; 3GPP TSG RAN WG2 Meeting #91bis, R2-154557; Malmo, Sweden; Oct. 5-9, 2015 (2 pages).

Alcatel-Lucent, Alcatel-Lucent Shanghai Bell; "Considerations on PRACH for LC-MTC"; 3GPP TSG RAN WG1 Meeting #80, R1-150132; Athens, Greece; Feb. 9-13, 2015 (6 pages).

Nokia Networks; "RLM/RLF for Rel13 low complexity UE or/and UE in EC mode"; 3GPP TSG-RAN WG2 Meeting #91, R2-153615; Beijing, China; Aug. 24-28, 2015 (2 pages).

3GPP TS 36.300 V13.3.0; "3rd Generation Partnership Project; Technical Specification Group Radio Access Network; Evolved Universal Terrestrial Radio Access (E-UTRA) and Evolved Universal Terrestrial Radio Access Network (E-UTRA); Overall description; Stage 2 (Release 13)"; Mar. 2016 (295 pages).

3GPP TS 36.331 V13.1.0; "3rd Generation Partnership Project; Technical Specification Group Radio Access Network; Evolved Universal Terrestrial Radio Access (E-UTRA); Radio Resource Control (RRC); Protocol specification (Release 13)"; Mar. 2016 (551 pages).

3GPP TS 36.133 V13.3.0; "3rd Generation Partnership Project; Technical Specification Group Radio Access Network; Evolved Universal Terrestrial Radio Access (E-UTRA); Requirements for support of radio resource management (Release 13)"; Mar. 2016 (1581 pages).

Office Action issued in the counterpart Japanese Patent Application No. 2018-214675, dated Feb. 4, 2020 (8 pages).

Office Action issued in the counterpart Chinese Patent Application No. 201680063076.6, dated Oct. 10, 2020 (41 pages).

* cited by examiner

USER DEVICE FOR DETECTING RADIO LINK FAILURE IN ENHANCED COVERAGE MODE

TECHNICAL FIELD

The present invention relates to a user device and a radio communication method that support an enhanced coverage mode (EC mode).

BACKGROUND ART

3rd Generation Partnership Project (3GPP) specifies Long Term Evolution (LTE), and with the aim of further speeding, specifies the LTE including LTE-Advanced (hereinbelow, the LTE includes the LTE-Advanced).

In Release-13 of the LTE, as a part of specifications regarding a user device (user equipment) for Machine Type Communication (MTC-UE), an enhanced coverage mode (EC mode) that aims to achieve the same effect as that of cell coverage enhancement is studied.

The enhanced coverage mode considers the characteristics of the location where MTC-UE is installed (such as basement and inside metal box) and gradually lowers the threshold of the reception power level (RSRP/RSRQ) to equivalently enhance the coverage of a cell. Specifically, Cell Extension (CE) level 0 (without enhancement) to CE level 3 are stipulated in the Release-13.

It has been pointed out that, in the enhanced coverage mode, it is necessary to execute radio link monitoring (RLM) according to the CE level (for example, Non-Patent Document 1). Moreover, it has been agreed upon in the 3GPP that it is possible to specify judgment conditions of radio link failure (RLF) according to the CE level.

PRIOR ART DOCUMENT

Non-Patent Document

[Non-Patent Document 1]: 3GPP R2-153615 "RLM/RLF for Rel13 low complexity UE or/and UE in EC mode," Nokia Networks, 3GPP, August 2015.

SUMMARY OF THE INVENTION

As explained above, the enhanced coverage mode operates under the adverse condition of a bad propagation environment. Accordingly, in the enhanced coverage mode, the MTC-UE executes the RLM in an area where SINR (Single to Interference and Noise Ratio) of a radio signal received from a radio base station (eNB) is low. In such a case, it has been pointed that a certain time is required till the necessary monitoring is completed, and thus it may take longer to complete the RLM.

Therefore, if a timer threshold (timer value), specifically, if T310/T311/N310/N311 for RLF detection applicable to a normal mode (a non-enhanced coverage mode), which is not the enhanced coverage mode, is applied to the MTC-UE, there is concern that sufficient measurement time to execute the RLM cannot be secured, and unexpected RLF may occur frequently.

The present invention has been made in view of the above circumstances. It is an object of the present invention to provide a user device and a radio communication method that are capable of appropriately detecting a radio link failure (RLF) even when the enhanced coverage mode is in operation.

A user device according to one aspect of the present invention is capable of being set in a first mode that sets a radio link with a radio base station based on a reference reception power level of a radio signal transmitted from the radio base station, and a second mode that sets the radio link based on any one among a plurality of reduced levels having gradually reduced reference reception power levels than the reference reception power level used in the first mode.

The user device includes a level setting unit that sets, when the user device is set in the second mode, a reception quality threshold of the reference reception power level specified for the reduced level; and a radio link monitoring unit that executes monitoring of the radio link based on the reception quality threshold set by the level setting unit. The level setting unit sets the reception quality threshold specified for the maximum reduced level regardless of whether the user device is set to any of the reduced levels.

A user device according to another aspect of the present invention is capable of being set in a first mode that sets a radio link with a radio base station based on a reference reception power level of a radio signal transmitted from the radio base station, and a second mode that sets the radio link based on any one among a plurality of reduced levels having gradually reduced reference reception power levels than the reference reception power level used in the first mode.

The user device includes a level setting unit that sets, when the user device is set in the second mode, a reception quality threshold of the reference reception power level specified for the reduced level; and a radio link monitoring unit that measures a reception power level of the radio signal, and executes monitoring of the radio link based on the reception quality threshold set by the level setting unit. The level setting unit sets the reception quality threshold specified for the reception power level measured by the radio link monitoring unit regardless of whether the user device is set to any of the reduced levels.

A radio communication method according to still another aspect of the present invention is capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode.

The radio communication method includes transmitting notification information that notifies the user device of a reception quality threshold of the reference reception power level. The transmitting includes transmitting to the user device the notification information that includes the reception quality threshold specified for each reduced level.

A radio communication method according to still another aspect of the present invention is capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode.

The radio communication method includes transmitting to the user device individual information dedicated to the user device. The transmitting includes transmitting to the user device the individual information that includes a reception quality threshold of the reference reception power level. The individual information includes the reception quality threshold specified for each reduced level.

A radio communication method according to still another aspect of the present invention is capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode.

The radio communication method includes transmitting notification information that notifies the user device of timer values to be used for monitoring the radio link in the reduced level. The transmitting includes transmitting to the user device the timer values specified for each reduced level.

A radio communication method according to still another aspect of the present invention is capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode.

The radio communication method includes transmitting notification information that notifies the user device of timer values to be used for monitoring the radio link in the reduced level. The transmitting includes transmitting to the user device the timer values specified for a part of the reduced levels that differ from timer values specified for the reference reception power level.

A radio communication method according to still another aspect of the present invention is capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode.

The radio communication method includes transmitting to the user device individual information that is dedicated to the user device. The transmitting includes transmitting to the user device the individual information that includes timer values to be used for monitoring the radio link in the reduced level. The individual information includes the timer values specified for a part of the reduced levels that differ from timer values specified for the reference reception power level.

MODES FOR CARRYING OUT THE INVENTION

Exemplary embodiments of the present invention are explained below with reference to the accompanying drawings. In the drawings, structural elements having the same function or configuration are indicated by the same or similar reference numerals and the explanation thereof is appropriately omitted.

(1) Overall Structural Configuration of Radio Communication System

Figure 1:
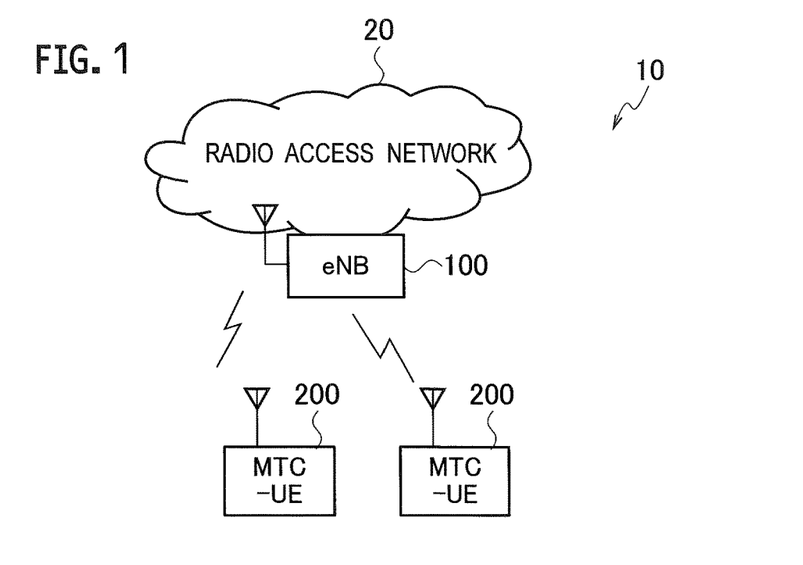
FIG. 1 is an overall structural diagram of a radio communication system 10.

FIG. 1 is an overall structural diagram of a radio communication system 10 according to the present embodiment. The radio communication system 10 is a radio communication system using the Long Term Evolution (LTE), and includes a radio access network 20 and a mobile station 200 (hereinafter, "UE 200").

The radio access network 20 is Evolved Universal Terrestrial Radio Access Network (E-UTRAN) stipulated in the 3GPP, and includes a radio base station 100 (hereinafter, "eNB 100"). The radio communication system 10 is not necessarily limited to the LTE (E-UTRAN). For example, the radio access network 20 can be a radio access network that includes a radio base station that executes radio communication with the UE 200 (user device) defined as 5G.

The eNB 100 and the UE 200 perform LTE radio communication. In the present embodiment, particularly, the eNB 100 and the UE 200 support an enhanced coverage mode (EC mode).

Specifically, the eNB 100 and the UE 200 are capable of setting up a radio link based on a normal mode (a non-enhanced coverage mode) or the enhanced coverage mode.

In the non-enhanced coverage mode (a first mode), the radio link is set based on a reference reception power level (specifically, RSRP/RSRQ) of a radio signal transmitted from the eNB 100. In the enhanced coverage mode, a radio link is set based on any among a plurality of CE levels (reduced levels) having gradually lowered reference received power levels compared to the reference reception power level of the non-enhanced coverage mode.

In the CE levels, CE levels from 0 (no enhancement) to 3 are stipulated. For example, in the CE level 1, the reference reception power level is reduced by 5 dB, and in the CE level 3, the reference reception power level is reduced by 15 dB.

In this manner, the UE 200 supports the enhanced coverage mode. Although the type of the UE 200 is not particularly limited to any one type, in the present embodiment in particular, the UE 200 intends to be a user device (MTC-UE) that performs Machine Type Communication (MTC).

(2) Functional Block Configuration of Radio Communication System

A functional block configuration of the radio communication system 10 is explained below. Specifically, functional block configurations of the eNB 100 and the UE 200 are explained below.

(2.1) eNB 100

Figure 2:
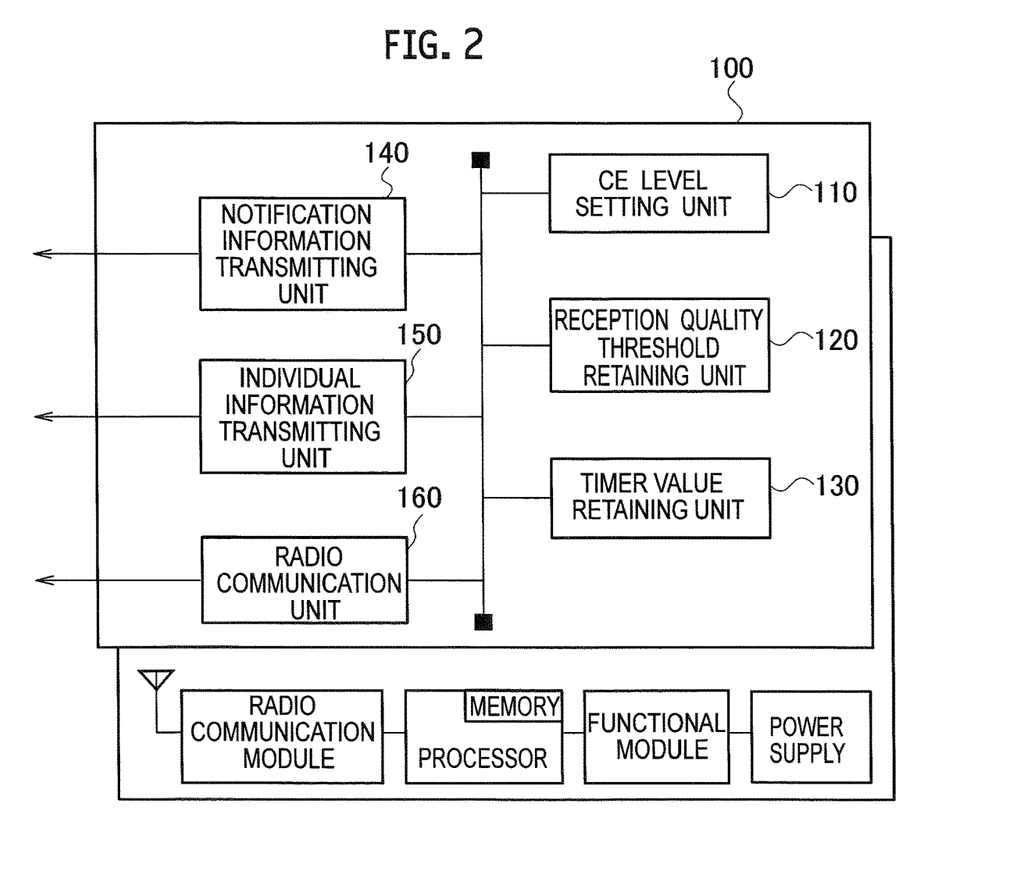
FIG. 2 is a functional block diagram of eNB 100.

FIG. 2 is a functional block diagram of the eNB 100. As shown in FIG. 2, the eNB 100 includes CE level setting unit 110, a reception quality threshold retaining unit 120, a timer value retaining unit 130, a notification information transmitting unit 140, an individual information transmitting unit 150, and a radio communication unit 160.

Furthermore, as shown in FIG. 2, each functional block of the eNB 100 is implemented by hardware elements such as a radio communication module, a processor (including a memory), a functional module (a network IF and the like), and a power supply.

The CE level setting unit 110 sets the CE level (levels 0 to 3) for the enhanced coverage mode. Specifically, the CE level setting unit 110 sets the CE level that the eNB 100 supports. Furthermore, the CE level setting unit 110 is caused to notify the UE 200 of the set CE level via notification information or individual information.

Moreover, the CE level setting unit 110 sets the CE level applicable to the UE 200 via the radio communication unit 160.

The reception quality threshold retaining unit 120 retains a reception quality threshold of the reference reception power level (RSRP/RSRQ) of a radio signal received by the UE 200 from the eNB 100. Specifically, the reception quality threshold retaining unit 120 retains Qin and Qout values for each CE level according to the RSRP/RSRQ.

Qout is a threshold value used to detect a radio link failure (RLF), specifically, 'out of sync.' status. Qin is a threshold value used to detect a recovery from the RLF, specifically, 'in sync.' status. The Qin and the Qout are stipulated in 3GPP TS 36.133 and the like.

The timer value retaining unit 130 retains timer values to be used for monitoring of a radio link set with the UE 200. Specifically, the timer value retaining unit 130 retains T310/T311/N310/N311 as timer values.

The T310 is a radio link failure timer that specifies the time required till a radio link failure is detected. The T311 is RRC re-establishment timer that specifies the time required till a radio link recovery is detected.

The N310 indicates 'maximum consecutive out-of-sync indications from lower layers', and specifies the detection frequency of the 'out of sync.' status till the T310 starts. The N311 indicates 'minimum consecutive in-sync indications from lower layers', and specifies the detection frequency of the 'in sync.' status till the T310 stops.

In addition to the timer values for the non-enhanced coverage mode, the timer value retaining unit 130 can acquire and retain timer values to be used for monitoring a radio link in the enhanced coverage mode, in other words, in the CE level.

The notification information transmitting unit 140 transmits notification information to a plurality of the UEs 200. Specifically, the notification information transmitting unit 140 transmits Master Information Block (MIB) and System Information Block (SIB) to be broadcasted to a plurality of the UEs 200.

Moreover, the notification information transmitting unit 140 can transmit notification information that notifies the UE 200 of a reception quality threshold (Qin/Qout) of the reference reception power level (RSRP/RSRQ) for the UE 200.

Specifically, the notification information transmitting unit 140 transmits notification information (MIB or SIB) that includes the reception quality threshold. Moreover, the notification information transmitting unit 140 can transmit to the UE 200 notification information that includes the reception quality threshold specified for each CE level.

Alternatively, the notification information transmitting unit 140 can also transmit notification information that includes a difference between a reception quality threshold specified for each CE level and the reception quality threshold of the reference reception power level for the non-enhanced coverage mode.

Moreover, the notification information transmitting unit 140 transmits notification information that notifies the UE 200 of the timer values retained by the timer value retaining unit 130.

When notifying the timer values, the notification information transmitting unit 140 can transmit to the UE 200 a coefficient that can identify the relation between the timer values specified for each CE level, and the timer values specified for the reference reception power level in the non-enhanced coverage mode.

Specifically, the notification information transmitting unit 140 can transmit a scaling factor applicable to T310/T311/N310/N311 as the coefficient. For example, if the value of T310 at the CE level 3 is a times the value of T310 in the non-enhanced coverage mode (including CE level 0), value of a is transmitted to the UE 200.

Moreover, the notification information transmitting unit 140 can also transmit to the UE 200 the timer values specified for apart of the CE levels, which differ from the timer values specified for the reference reception power level in the non-enhanced coverage mode.

Specifically, the notification information transmitting unit 140 transmits to the UE 200 only the timer values specified for a part of the CE levels (for example, the CE levels 2 and 3).

The individual information transmitting unit 150 transmits to the UE 200 individual information that is dedicated to the UE 200. Specifically, the individual information transmitting unit 150 transmits a RadioResourceConfigDedicated to the UE 200. The RadioResourceConfigDedicated is stipulated in 3GPP TS 36.331, and is transmitted to the UE 200 during the process of setting RRC connection.

The individual information transmitting unit 150 can transmit to the UE 200 individual information (RadioResourceConfigDedicated) that includes a reception quality threshold of the reference reception power level in the non-enhanced coverage mode. The individual information transmitting unit 150 can also include in the individual information the reception quality threshold (Qin/Qout) specified for each CE level.

Alternatively, the individual information transmitting unit 150 can also include in the individual information a difference between the reception quality threshold specified for each CE level and the reception quality threshold of the reference reception power level in the non-enhanced coverage mode.

The individual information transmitting unit 150 transmits to the UE 200 individual information (RadioResourceConfigDedicated) that includes the timer values to be used for monitoring the radio link in the CE level.

Moreover, the individual information transmitting unit 150 can also include in the individual information the timer values specified for a part of the CE levels, which differ from the timer values specified for the reference reception power level in the non-enhanced coverage mode.

Specifically, the individual information transmitting unit 150 can also include in the individual information only the timer values specified for a part of the CE levels (for example, the CE levels 2 and 3).

The radio communication unit 160 performs radio communication with the UE 200. Specifically, the radio communication unit 160 executes processes such as a random access (RA) procedure and RRC connection setting, and sets a radio link.

(2.2) UE 200

Figure 3:
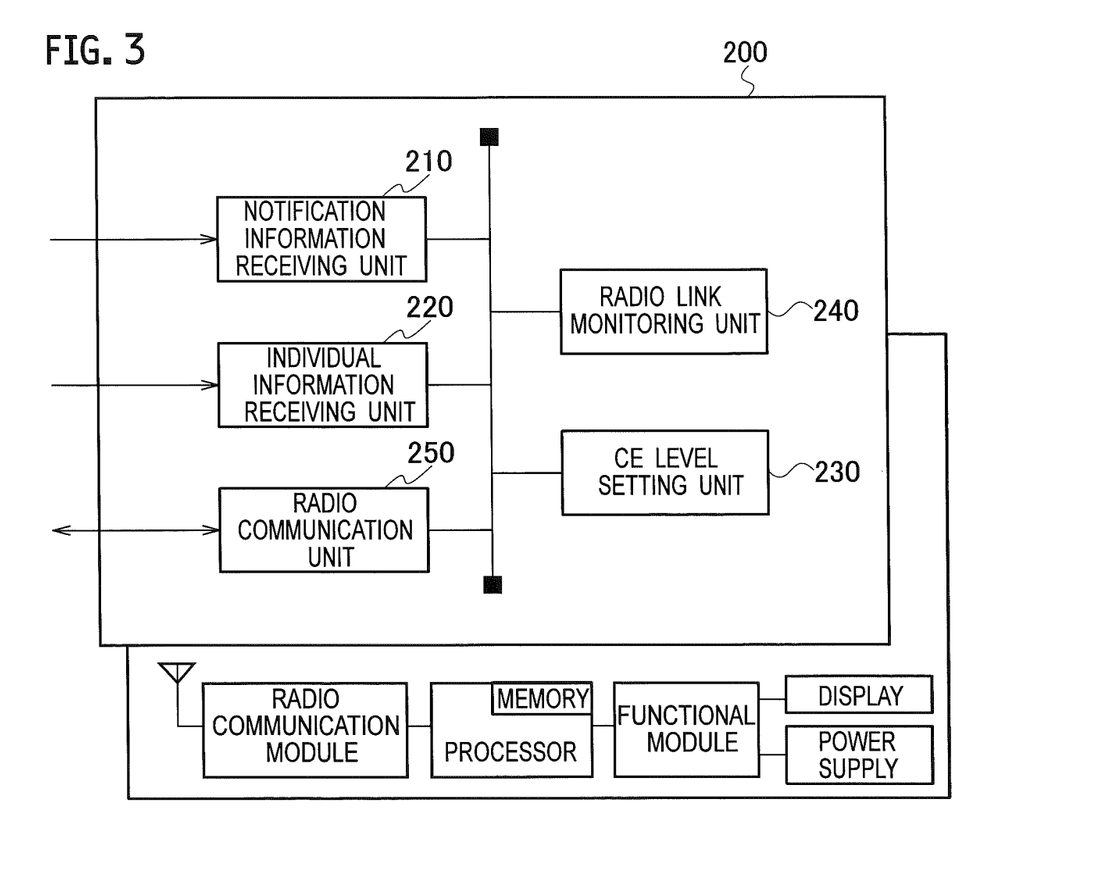
FIG. 3 is a functional block diagram of UE 200.

FIG. 3 is a functional block diagram of the UE 200. As shown in FIG. 3, the UE 200 includes a notification information receiving unit 210, an individual information receiving unit 220, CE level setting unit 230, a radio link monitoring unit 240, and a radio communication unit 250.

Furthermore, as shown in FIG. 3, each functional block of the UE 200 is implemented by hardware elements such as a radio communication module, a processor (including a memory), a functional module (an external connection IF, position detection, various measurements, and the like), a display, and a power supply (such as a battery).

The notification information receiving unit 210 receives the notification information transmitted by the eNB 100. Specifically, the notification information receiving unit 210 receives the MIB and the SIB transmitted by the eNB 100.

The individual information receiving unit 220 receives the individual information transmitted by the eNB 100. Specifically, the individual information receiving unit 220 receives the RadioResourceConfigDedicated transmitted by the eNB 100.

The CE level setting unit 230 determines, when the UE 200 is set in the enhanced coverage mode (a second mode), the CE level (0 to 3) to be set in the UE 200 based on the reception power level (RSRP/RSRQ) of the radio signal (reference signal) transmitted from the eNB 100.

Specifically, the CE level setting unit 230 determines the CE level having the larger reduction in the reference reception power level as the RSRP/RSRQ of the reference signal measured by the radio link monitoring unit 240 is lower. As explained above, in the CE level 1, the reference reception power level is reduced by 5 dB, and in the CE level 3, the reference reception power level is reduced by 15 dB.

Moreover, the CE level setting unit 230 sets a reception quality threshold (Qin/Qout) of the reference reception power level specified for the determined CE level.

The CE level setting unit 230 can set the reception quality threshold specified for the maximum CE level, regardless of whether the UE 200 is set to any of the CE levels or not. In other words, even when the CE level specified for the RSRP/RSRQ of the reference signal transmitted from the eNB 100 is the CE level 1, and if the eNB 100 supports the CE level 3 (the maximum CE level), the CE level setting unit 230 sets the reception quality threshold specified for the CE level 3.

Alternatively, the CE level setting unit 230 can also set a reception quality threshold specified for the RSRP/RSRQ measured by the radio link monitoring unit 240, regardless of whether the UE 200 is set to any of the CE levels or not. For example, even if the eNB 100 supports up to the CE level 3, and when the CE level specified for the measured RSRP/RSRQ is the CE level 1, the CE level setting unit 230 sets the reception quality threshold specified for the CE level 1.

The radio link monitoring unit 240 monitors the radio link set with the eNB 100. Specifically, the radio link monitoring unit 240 executes monitoring of the radio link set by the radio communication unit 250. Moreover, the radio link monitoring unit 240 measures the reception power level (RSRP/RSRQ) of the radio signal (the reference signal) transmitted from the eNB 100.

Particularly, in the present embodiment, the radio link monitoring unit 240 executes, based on the reception quality threshold set by the CE level setting unit 230, monitoring of the radio link.

The radio communication unit 250 performs radio communication with the eNB 100. Specifically, the radio communication unit 250 executes processes such as a random access (RA) procedure and RRC connection setting, and sets a radio link.

(3) Operation of Radio Communication System

Operation of the radio communication system 10 is explained below. Specifically, transmission of notification information, transmission of individual information, and an operation of setting the CE level in the enhanced coverage mode are explained below.

(3.1) Transmission of Notification Information

Figure 4:
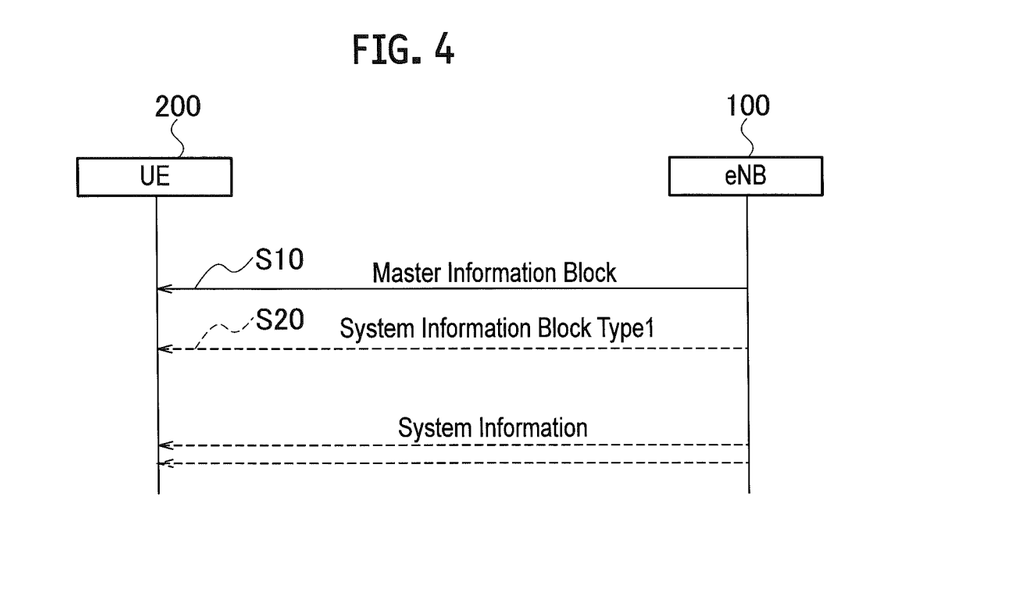
FIG. 4 shows a sequence of notifying the UE 200 of notification information transmitted from the eNB 100.

FIG. 4 shows a sequence of notifying the UE 200 of notification information transmitted from the eNB 100. As shown in FIG. 4, the eNB 100 first transmits the Master Information Block (MIB) (S10).

After transmitting the MIB, the eNB 100 transmits the System Information Block (SIB) (S20). Various types of SIB are stipulated, and the eNB 100 transmits SIBs sequentially, starting from SIB Type 1 (SIB1).

As explained above, the eNB 100 can include in the MIB or the SIB (such as SIB1 to SIB5) the reception quality threshold and the timer values specified for each CE level.

Furthermore, instead of the existing MIB or SIB, the eNB 100 can include the reception quality threshold and the timer values specified for each CE level in a new SIB for the MTC-UE.

(3.2) Transmission of Individual Information

Figure 5:
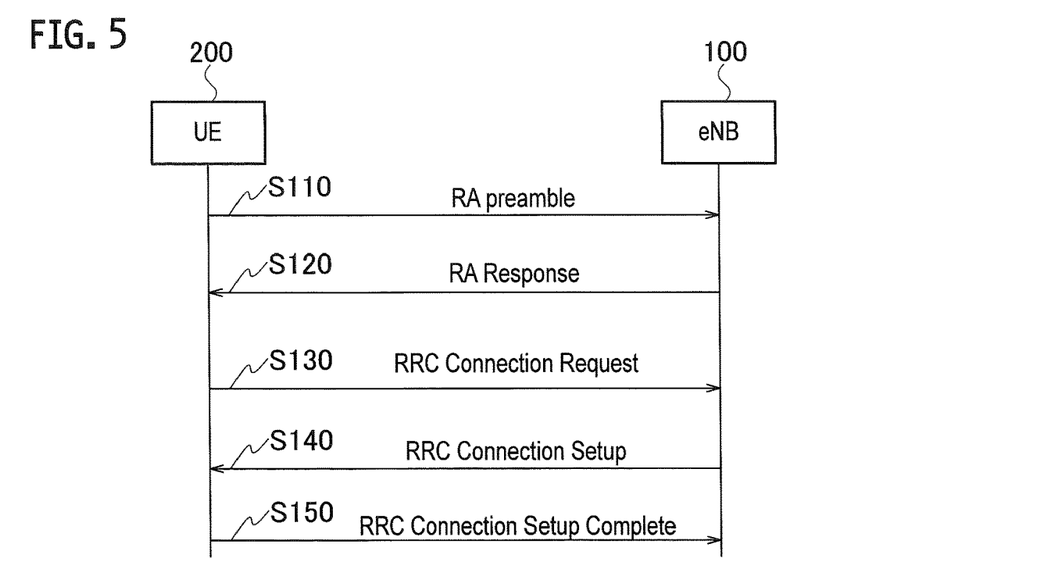
FIG. 5 shows RA procedure and RRC connection establishment sequence executed by the eNB 100 and the UE 200.

FIG. 5 shows RA procedure and RRC connection establishment sequence executed by the eNB 100 and the UE 200. As shown in FIG. 5, the UE 200 executes the RA procedure before executing the RRC connection establishment. Specifically, the UE 200 transmits RA Preamble to the eNB 100 (S110).

The eNB 100 transmits to the UE 200 RA response as a response to the RA Preamble (S120). The UE 200 obtains from the RA Response information such as radio resources used for communication with the eNB 100.

The UE 200 transmits to the eNB 100 RRCConnectionRequest to start communication with the radio access network 20 (the eNB 100) (S130).

The eNB 100 transmits, based on the received RRCConnectionRequest, RRCConnectionSetup (S140).

Based on the content of the received RRCConnectionSetup, the UE 200 sets and establishes the RRC connection. Upon completion of the RRC connection setting, the UE 200 transmits to the eNB 100 RRCConnectionSetupComplete (S150).

As explained above, the eNB 100 can include the reception quality threshold and the timer values specified for each CE level in the RadioResourceConfigDedicated to be transmitted to the UE 200 during the RRC connection setting.

(3.3) Operation of Setting CE Level in Enhanced Coverage Mode

An operation of setting the CE level in the enhanced coverage mode is explained below with reference to FIGS. 6 to 11.

(3.3.1) Operation Example 1

Figure 6:
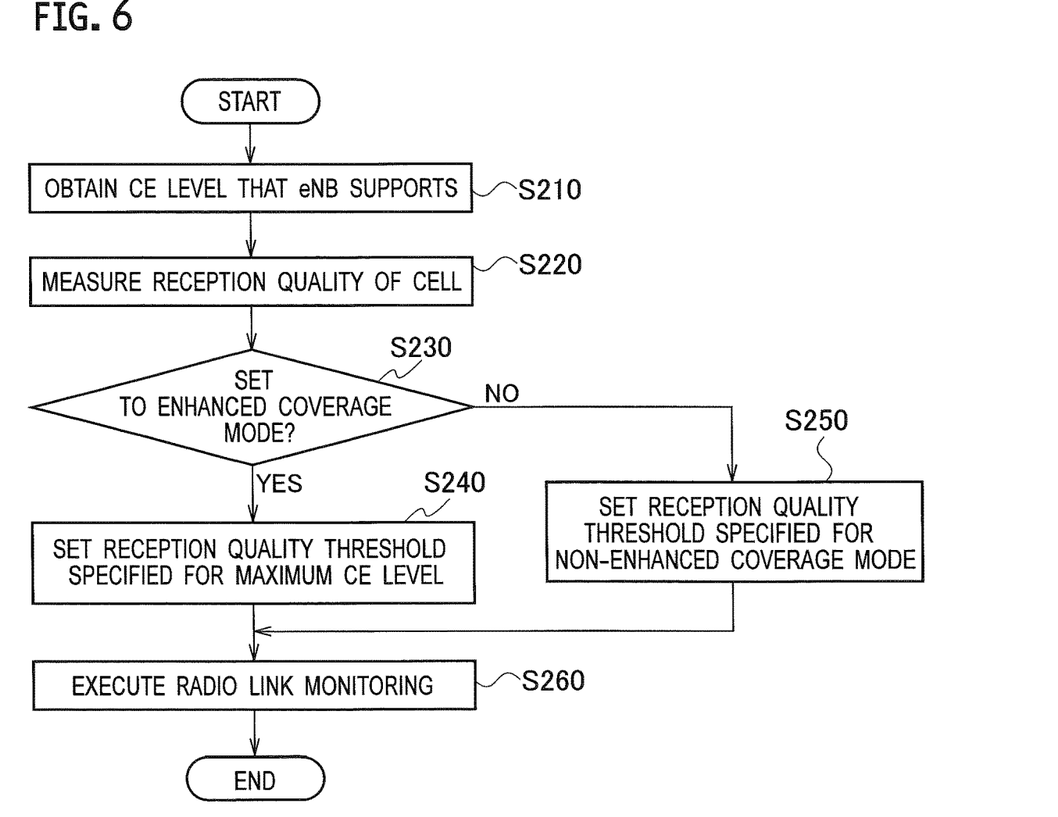
FIG. 6 is a flowchart showing an operation example 1 of setting CE level.

FIG. 6 is a flowchart showing an operation example 1 of setting the CE level. As shown in FIG. 6, the UE 200 obtains the CE level that the eNB 100 supports (S210).

The UE 200 measures a reception quality of a cell formed by the eNB 100 (S220). Specifically, the UE 200 measures a reception power level of a radio signal (reference signal) transmitted from the eNB 100, and determines the reception quality of the cell.

The UE 200 determines, based on the reception quality, whether to set the enhanced coverage mode or not (S230).

When set to the enhanced coverage mode, regardless of the reception quality of the cell, the UE 200 sets a reception quality threshold (specifically, Qout) of the CE level (for example, CE level 3) having the maximum coverage enhancement among the CE levels supported by the eNB 100 (S240). In other words, regardless of whether the UE 200 is set to any of the CE levels or not, the UE 200 sets the reception quality threshold specified for the maximum CE level.

For example, even if the result of the reception quality measurement of the cell executed by the UE 200 is the CE level 1, and the eNB 100 supports up to the CE level 3, radio link monitoring is executed by using Qout specified for the CE level 3.

Furthermore, even though the eNB 100 notifies different RACH resources (PRACH-Config, RACH-Config) for each CE level via notification information (SIB2), the UE 200, depending on whether the RACH resources are notified for each CE level, can determine whether the CE level is supported in the cell or not.

When set to the non-enhanced coverage mode, the UE 200 sets the reception quality threshold (Qout) specified for the non-enhanced coverage mode, in other words, a normal reception quality threshold (Qout) (S250).

The UE 200 uses the Qout set at Step S240 or Step S250 to execute the radio link monitoring (S260).

(3.3.2) Operation Example 2

Figure 7:
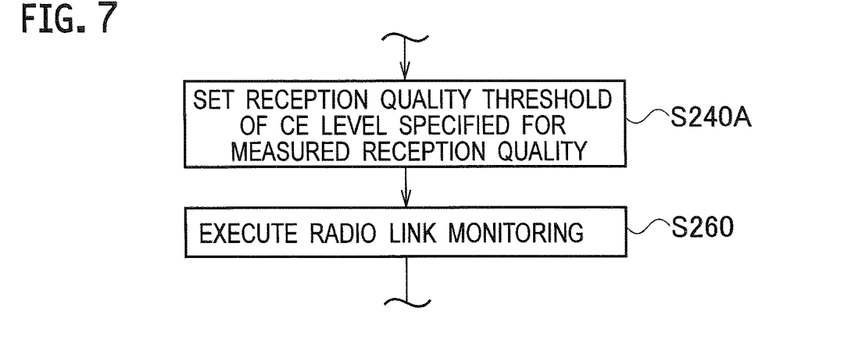
FIG. 7 is a flowchart showing an operation example 2 of setting the CE level.
Figure 8:
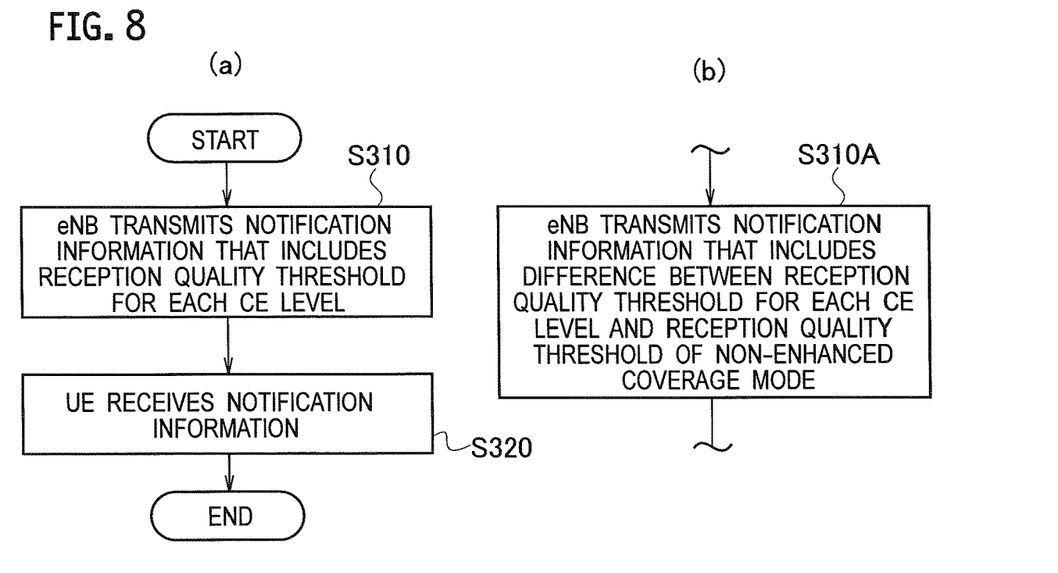
FIGS. 8(a) and 8(b) are flowcharts showing an operation example 3 of setting the CE level.

FIG. 7 is a flowchart showing an operation example 2 of setting the CE level. In FIG. 7, the process performed at Step S240 of the operation example 1 shown in FIG. 6 is replaced.

As shown in FIG. 7, when set to the enhanced coverage mode, the UE 200 determines the CE level specified for the measured reception quality. The UE 200 sets a reception quality threshold (Qout) specified for the determined CE level (S240A). In other words, regardless of whether the UE 200 is set to any of the CE levels or not, the UE 200 sets a reception quality threshold specified for the measured reception power level (RSRP/RSRQ).

For example, even if the eNB 100 supports up to the CE level 3, and the result of the reception quality measurement of the cell executed by the UE 200 corresponds with the CE level 1, the UE 200 uses the Qout specified for the CE level 1 to execute the radio link monitoring.

The operation example 2 presents an operation contradictory to that of the operation example 1. The reason for the same is because even if the CE level changes, it is assumed that the UE 200 does not notify the eNB 100 of the change after setting the radio link, and thus, the operation example 2 also considers a scenario where it is preferable to set the reception quality threshold according to the actual reception power level.

(3.3.3) Operation Example 3

FIGS. 8(a) and 8(b) are flowcharts showing an operation example 3 of setting the CE level. As shown in FIG. 8(a), the eNB 100 transmits notification information (MIB or SIB) that includes a reception quality threshold (Qin/Qout) of each CE level (S310).

The UE 200 receives the notification information and obtains the reception quality threshold of each CE level (S320).

The existing 3GPP specifications implicitly defines that a reception quality threshold (Qin/Qout) is the value of SINR of the CRS (cell specific reference signal) of the area where PDCCH (physical downlink control channel) is transmitted. Specifically, it is possible to obtain the threshold value based on the simulation conditions specified in the 3GPP TS 36.133. The threshold value, however, is not clearly stipulated.

For example, the threshold value 'Qin: −6 dB, Qout: −8 dB' is mentioned as a value for simulation evaluation in TR 36.839.

Moreover, as shown in FIG. 8(b), the eNB 100 can also transmit notification information (MIB or SIB) that includes a difference between the reception quality threshold of each CE level and the reception quality threshold (Qin/Qout) of the non-enhanced coverage mode (S310A).

For example, the eNB 100 transmits notification information that includes a value (dB) indicating the difference between the Qin/Qout (−6 dB, −8 dB) of the non-enhanced coverage mode and the Qin/Qout of the CE level 1.

Furthermore, if the notification information is not to be used, the UE 200 can store the reception quality threshold (Qin/Qout) of each CE level as a fixed value.

(3.3.4) Operation Example 4

Figure 9:
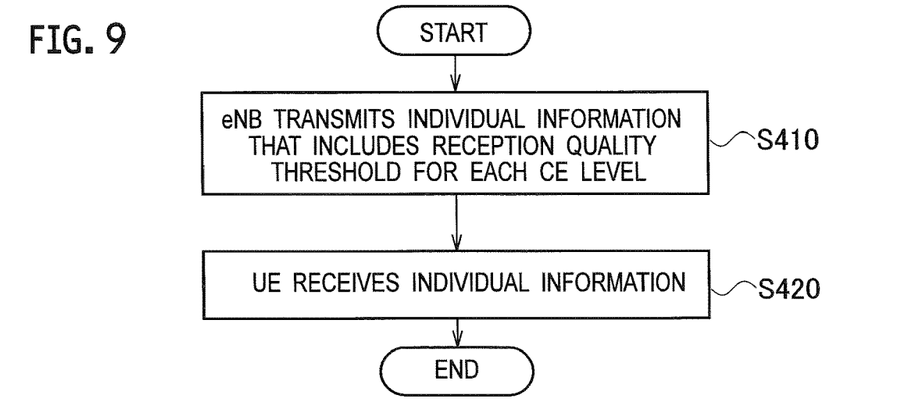
FIG. 9 is a flowchart showing an operation example 4 of setting the CE level.

FIG. 9 is a flowchart showing an operation example 4 of setting the CE level. As shown in FIG. 9, the eNB 100 transmits individual information (RadioResourceConfigDedicated) that includes a reception quality threshold (Qin/Qout) of each CE level (S410).

The UE 200 receives the individual information and obtains the reception quality threshold of each CE level (S420).

Specifically, the UE 200 transmits to the eNB 100 the RA preamble selected according to the RSRP/RSRQ of the measured radio signal (reference signal) (refer to Step S110 of FIG. 5). Upon receiving the RA Preamble, the eNB 100 can recognize the CE level corresponding to the RSRP/RSRQ measured by the UE 200.

At Step S410, the eNB 100 can transmit the reception quality threshold of all CE levels, or the eNB 100 can transmit only the reception quality threshold of the CE level corresponding to the RSRP/RSRQ measured by the UE 200.

(3.3.5) Operation Example 5

FIGS. 10(a) and 10(b) are flowcharts showing an operation example 5 of setting the CE level. As shown in FIG. 10(a), the eNB 100 transmits notification information (MIB or SIB) that includes the timer values (T310/T311/N310/N311) for each CE level (S510).

The UE 200 receives the notification information and obtains the timer values for each CE level (S520).

Figure 10:
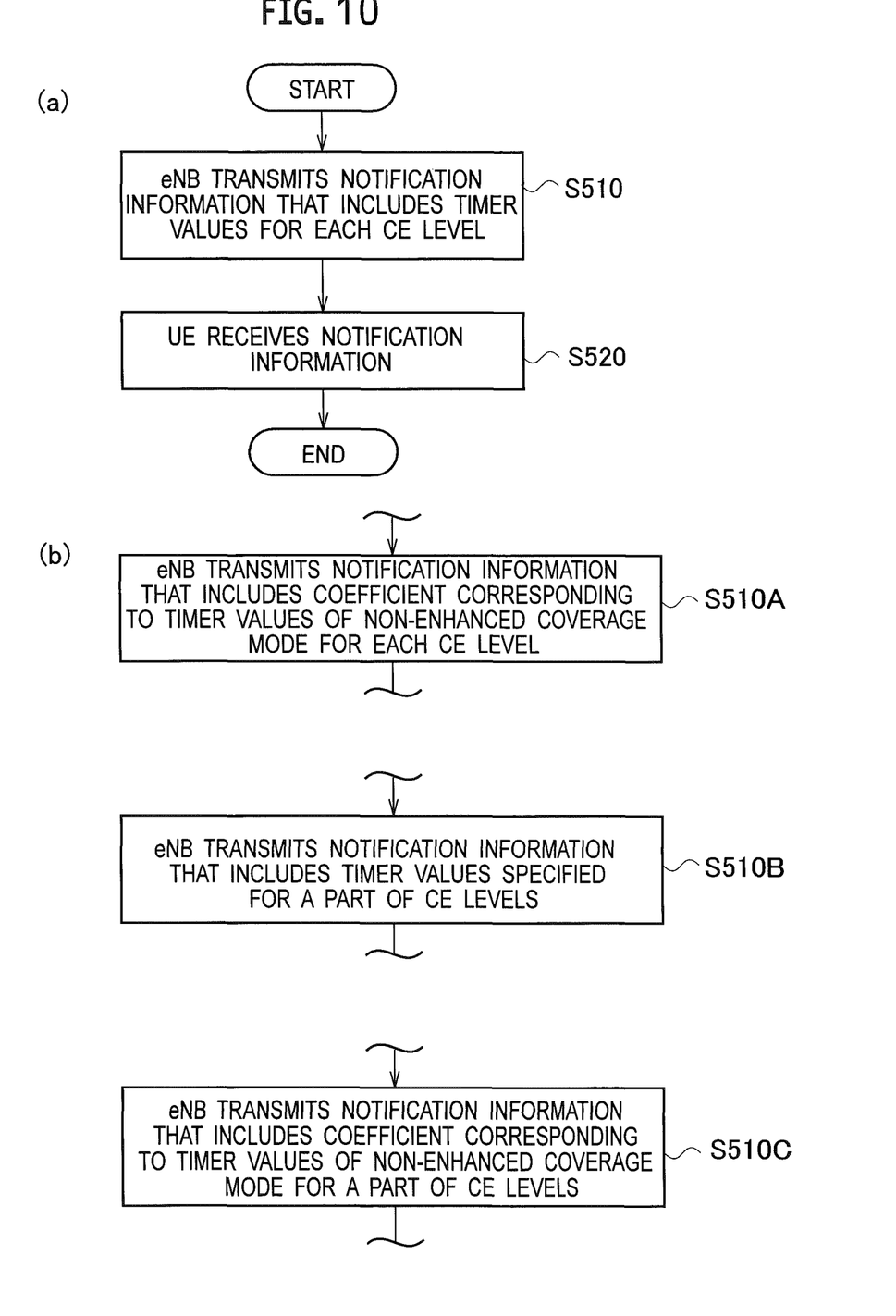
FIGS. 10(a) and 10(b) are flowcharts showing an operation example 5 of setting the CE level.

Moreover, as shown in FIG. 10(*b*), instead of transmitting the timer values for each CE level as is, the eNB 100 can transmit notification information that includes a coefficient that can identify the relation between the timer values specified for each CE level and the timer values specified for the reference reception power level in the non-enhanced coverage mode (S510A).

Specifically, as explained above, for example, if the value of T310 for the CE level 3 is a times the value of T310 of the non-enhanced coverage mode (including CE level 0), the value of α can be included in the notification information as the coefficient (scaling factor).

Moreover, the eNB 100 can also transmit notification information that includes the timer values specified for a part of the CE levels, which differ from the timer values specified for the non-enhanced coverage mode (S510B).

Specifically, the eNB 100 can include in the notification information T310/T311/N310/N311 values specified for a part of the CE levels, which are applicable to the timer values that differ from the timer values specified for the non-enhanced coverage mode notified by the conventional SIB2.

Furthermore, even if T310/T311/N310/N311 values specified for a part of the CE levels are included in the notification information, the eNB 100 can include in the notification information a coefficient that can identify the relation between the timer values specified for a part of the CE levels and the timer values specified for the reference reception power level in the non-enhanced coverage mode (S510C).

(3.3.6) Operation Example 6

Figure 11:
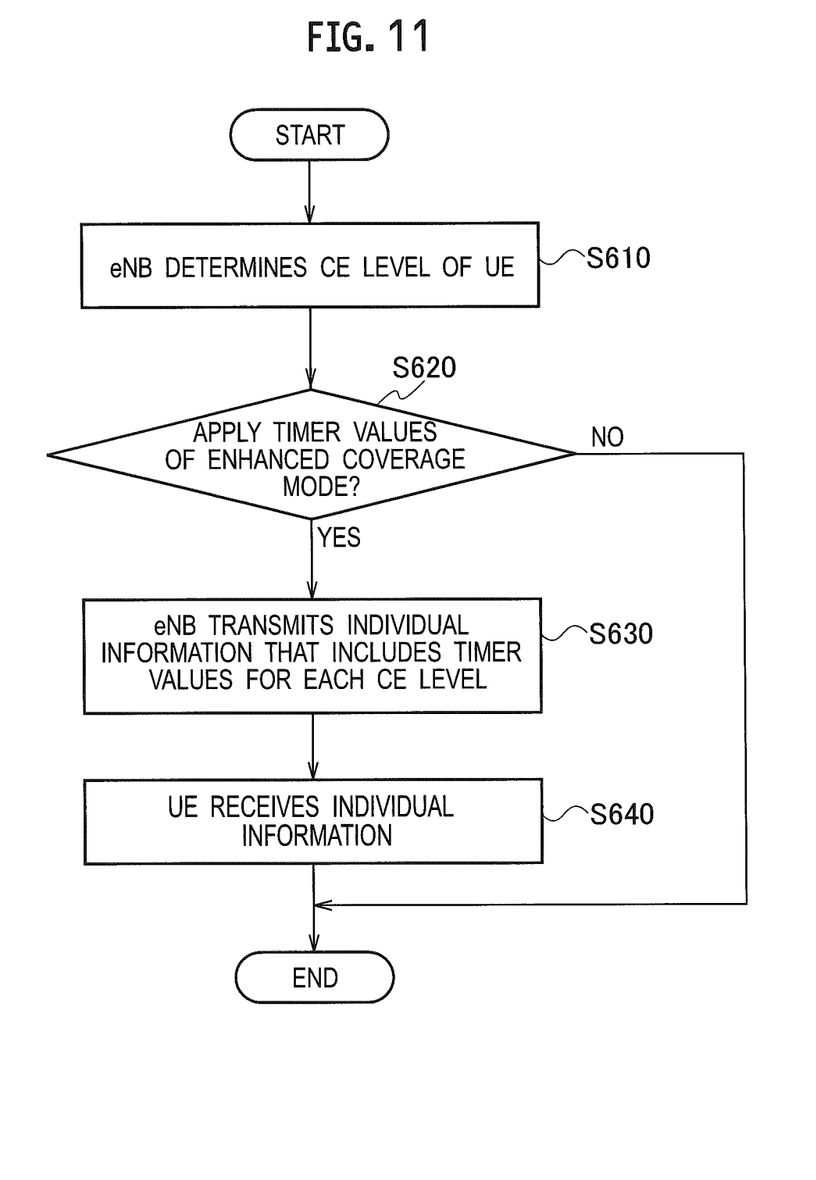
FIG. 11 is a flowchart showing an operation example 6 of setting the CE level.

FIG. 11 is a flowchart showing an operation example 6 of setting the CE level. As shown in FIG. 11, the eNB 100 determines the CE level to be applied to the UE 200 (S610). As explained above, receiving the RA Preamble from the UE 200 makes it possible for the eNB 100 to recognize the CE level corresponding to the RSRP/RSRQ measured by the UE 200.

The eNB 100 determines, based on the CE level of the UE 200, whether to apply the timer values for the enhanced coverage mode (S620). Specifically, the eNB 100 determines, according to the CE level of the UE 200, whether to apply the conventional (non-enhanced coverage mode) timer values (T310/T311/N310/N311) transmitted via the notification information or to apply different timer values specified for the CE level of the UE 200.

When the timer values for the enhanced coverage mode are to be applied, the eNB 100 transmits to the UE 200 individual information (RadioResourceConfigDedicated) that includes the timer values (S630). In other words, when the timer values that differ from the timer values for the non-enhanced coverage mode are to be applied, the eNB 100 notifies the UE 200 via the individual information of the timer values that differ from the timer values for the non-enhanced coverage mode notified via the conventional SIB2.

The UE 200 receives individual information that includes the timer values (S640).

(3.3.7) Other

In the operation examples 3 to 6 explained above, it is assumed that the reception quality threshold (Qin/Qout) and the timer values (T310/T311/N310/N311) are set for each CE level. However, instead of setting the reception quality threshold and the timer values for each CE level, the reception quality threshold and the timer values can be set by setting a pattern. For example, the same reception quality threshold and the same timer values can be set for all the CE levels 0 and 1, and a reception quality threshold and timer values, which are same for the CE levels 2 and 3 and differ from that of the CE levels 0 and 1, can be set for the CE levels 2 and 3.

(4) Effects and Advantages

According to the embodiment explained above, the following operational effects can be obtained. As explained above, when set to the enhanced coverage mode, the UE 200 can determine whether to set the reception quality threshold (Qin/Qout) specified for the maximum CE level (CE level 3), or whether to set the reception quality threshold specified for the measured reception power level.

Therefore, even if the enhanced coverage mode is in operation, it is possible to set a reception quality threshold according to conditions and environment present in the radio communication system 10. With this configuration, even if the enhanced coverage mode is in operation, radio link failure (RLF) can be appropriately detected.

Moreover, as explained above, the reception quality threshold and the timer values specified for each CE level can be notified to the UE 200 by including the same in the notification information (MIB/SIB) or the individual information (RadioResourceConfigDedicated). Therefore, the UE 200 can set an appropriate reception quality threshold and timer values in accordance with the CE level to be set in the UE 200. With this configuration, even if the enhanced coverage mode is in operation, radio link failure (RLF) can be appropriately detected.

Particularly, in the case of the enhanced coverage mode, even though it is assumed that radio link monitoring takes time, it is possible to set appropriate timer values according to the time required for the monitoring.

In the present embodiment, when transmitting the reception quality threshold to the UE 200, a difference between the reception quality threshold specified for each CE level and the reception quality threshold of the reference reception power level in the non-enhanced coverage mode can be used. Therefore, the amount of information to be transmitted to the UE 200 can be reduced, and the UE 200 can appropriately set the reception quality threshold.

Similarly, in the present embodiment, when transmitting timer values to the UE 200, a coefficient (scaling factor) that can identify the relation between the timer values specified for each CE level and the timer values specified for the reference reception power level in the non-enhanced coverage mode can be used. Therefore, the amount of information to be transmitted to the UE 200 can be reduced, and the UE 200 can appropriately set the timer values.

Moreover, according to the radio communication system 10, the conditions for which the UE 200 supporting the enhanced coverage mode detects the radio link failure (RLF) can be clarified, making a more equitable and precise operation of the radio communication system 10 possible.

(5) Other Embodiments

The present invention has been explained in detail using the above mentioned embodiments; however, it is self-evident to a person skilled in the art that the present invention is not limited to the embodiments explained herein and that the embodiments can be modified or improved in various ways.

For example, in the embodiment explained above, the RadioResourceConfigDedicated is used as individual information. However, the individual information is not necessarily the RadioResourceConfigDedicated. In other words, as long as the information is individually transmitted to the UE 200 from the eNB 100, other messages can be used.

Moreover, in the embodiment explained above, even if the explanation is intended for the MTC-UE, not only UE for MTC that performs radio communication in 6 RB (resource block), in other words, in 1.4 MHz bandwidth (for example, refer to Further LTE Physical Layer Enhancements for MTC (RP-150492)) but also UE for NarrowBand (NB)-IoT (for example, RP-151621) can be included as the UE 200. The UE for NB-IoT performs the radio communication in 1 RB (180 KHz bandwidth).

Furthermore, in the embodiment explained above, even though the UE 200 measures the RSRP/RSRQ of a radio signal (reference signal) and sets a reception quality threshold (Qin/Qout) corresponding to the RSRP/RSRQ, the UE 200 can measure SINR (Single to Interference and Noise Ratio) based on a radio signal, specifically, based on a Cell specific Reference Signal (CRS) instead of the RSRP/RSRQ, and can set a reception quality threshold corresponding to the SINR.

Furthermore, the order of processes in the sequences, flow charts, and the like in the embodiment explained above can be reshuffled as long as the order is kept consistent across sequences and flows.

Moreover, the terminology explained in the present description and/or the terminology necessary for understanding the present description can be replaced with the terminology having the same or similar meanings. For example, terms "channel" and/or "symbol" can be replaced with the term "signal". Moreover, the term "signal" can be replaced with the term "message". Furthermore, the terms "system" and "network" can be used interchangeably.

Furthermore, the parameters and the like explained above can be represented by absolute values, can be expressed as relative values with respect to the predetermined values, or can be represented by any other corresponding information. For example, a radio resource can be indicated by an index.

The eNB 100 (a base station) can accommodate one or multiple (for example, three) cells (also called sectors). When the base station accommodates the plurality of the cells, the entire coverage area of the base station can be divided into a plurality of smaller areas, and each of the smaller areas can provide communication services via a base station subsystem (for example, small type indoor base station RRH: Remote Radio Head).

The term "cell" or "sector" refers to a base station that executes communication service in this coverage and/or a part or the entire of the coverage area of the base station subsystem. Furthermore, the terms "base station", "eNB", "cell", and "sector" can be used interchangeably in the present description. The base station is also referred to as a fixed station, Node B, eNodeB (eNB), an access point, a femto cell, a small cell, and the like.

The UE 200 is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable terms, depending on a person skilled in the art.

The phrase "based on" used in the present description does not mean "based only on" unless specified particularly. It can also be interpreted that the phrase "based on" means both "based only on" and "based at least on".

Furthermore, the terms "including", "comprising", and various forms thereof are intended to be inclusive, similar to "equipped with". Furthermore, the term "or" used in the present description or in the claims does not intend to indicate an exclusive disjunction.

Any reference to an element using a designation such as "first", "second", and the like used in the present description generally does not limit the amount or order of those elements. Such designations can be used in the present description as a convenient way to distinguish between two or more elements. Thus, the reference to the first and second elements does not imply that only two elements can be adopted, or that the first element must precede the second element in some or the other manner.

Throughout the present description, for example, during translation, if articles such as a, an, and the in English are added, these articles shall include plurality, unless it is clearly indicated that it is not so according to the context.

The present invention can be expressed as below. According to one aspect of the present invention, a user device (UE 200) capable of being set in a first mode (a non-enhanced coverage mode) that sets a radio link with a radio base station (eNB 100) based on a reference reception power level (for example, RSRP/RSRQ) of a radio signal transmitted from the radio base station, and a second mode (an enhanced coverage mode) that sets the radio link based on any one among a plurality of reduced levels (CE levels) having gradually reduced reference reception power levels than the reference reception power level used in the first mode, includes a level setting unit (CE level setting unit 230) that sets, when the user device is set in the second mode, a reception quality threshold (Qin/Qout) of the reference reception power level specified for the reduced level; and a radio link monitoring unit (a radio link monitoring unit 240) that executes monitoring of the radio link based on the reception quality threshold set by the level setting unit. The level setting unit sets the reception quality threshold specified for the maximum reduced level regardless of whether the user device is set to any of the reduced levels.

According to another aspect of the present invention, a user device capable of being set in a first mode that sets a radio link with a radio base station based on a reference reception power level of a radio signal transmitted from the radio base station, and a second mode that sets the radio link based on any one among a plurality of reduced levels having gradually reduced reference reception power levels than the reference reception power level used in the first mode, includes a level setting unit that sets, when the user device is set in the second mode, a reception quality threshold of the reference reception power level specified for the reduced level; and a radio link monitoring unit that measures a reception power level of the radio signal, and executes monitoring of the radio link based on the reception quality threshold set by the level setting unit. The level setting unit sets the reception quality threshold specified for the reception power level measured by the radio link monitoring unit regardless of whether the user device is set to any of the reduced levels.

According to still another aspect of the present invention, a radio communication method capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes transmitting notification information that notifies the user device of a reception quality threshold of the reference reception power level. The transmitting includes transmitting to the user device the notification information that includes the reception quality threshold specified for each reduced level.

In the above aspect of the present invention, the transmitting can include transmitting the notification information that includes a difference between the reception quality threshold specified for each reduced level and a reception quality threshold of the reference reception power level.

According to still another aspect of the present invention, a radio communication method capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes transmitting to the user device individual information dedicated to the user device. The transmitting includes transmitting to the user device the individual information that includes a reception quality threshold of the reference reception power level. The individual information includes the reception quality threshold specified for each reduced level.

In the above aspect of the present invention, the transmitting can include including a difference between the reception quality threshold specified for each reduced level and a reception quality threshold of the reference reception power level in the individual information.

According to still another aspect of the present invention, a radio communication method capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes transmitting notification information that notifies the user device of timer values to be used for monitoring the radio link in the reduced level. The transmitting includes transmitting to the user device the timer values specified for each reduced level.

In the above aspect of the present invention, the transmitting can include, transmitting to the user device a coefficient that can identify a relation between the timer values specified for each reduced level and the timer values specified for the reference reception power level.

According to still another aspect of the present invention, a radio communication method capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes transmitting notification information that notifies the user device of timer values to be used for monitoring the radio link in the reduced level. The transmitting includes transmitting to the user device the timer values specified for a part of the reduced levels that differ from timer values specified for the reference reception power level.

According to still another aspect of the present invention, a radio communication method capable of setting a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes transmitting to the user device individual information that is dedicated to the user device. The transmitting includes transmitting to the user device the individual information that includes timer values to be used for monitoring the radio link in the reduced level. The individual information includes the timer values specified for a part of the reduced levels that differ from timer values specified for the reference reception power level.

According to still another aspect of the present invention, a radio base station (eNB 100) capable of being set in a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes a notification information transmitting unit (a notification information transmitting unit 140) that transmits notification information that notifies the user device of a reception quality threshold of the reference reception power level. The notification information transmitting unit transmits to the user device the notification information that includes the reception quality threshold specified for each reduced level.

In the above aspect of the present invention, the notification information transmitting unit can transmit the notification information that includes a difference between the reception quality threshold specified for each reduced level and a reception quality threshold of the reference reception power level.

According to still another aspect of the present invention, a radio base station (eNB 100) capable of being set in a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes an individual information transmitting unit (an individual information transmitting unit 150) that transmits to the user device individual information that is dedicated to the user device. The individual information transmitting unit transmits to the user device the individual information that includes a reception quality threshold of the reference reception power level. The individual information includes the reception quality threshold specified for each reduced level.

In the above aspect of the present invention, the individual information transmitting unit can include a difference between the reception quality threshold specified for each reduced level and a reception quality threshold of the reference reception power level in the individual information.

According to still another aspect of the present invention, a radio base station (eNB 100) capable of being set in a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes a notification information transmitting unit (a notification information transmitting unit 140) that transmits notification information that notifies the user device of timer values (T310/T311/N310/N311) to be used for monitoring the radio link in the reduced level. The notification information transmitting unit transmits to the user device the timer values specified for each reduced level.

In the above aspect of the present invention, the notification information transmitting unit can notify the user device of a coefficient that can identify a relation between the timer values specified for each reduced level and the timer values specified for the reference reception power level.

According to still another aspect of the present invention, a radio base station (eNB 100) capable of being set in a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes a notification information transmitting unit (a notification information transmitting unit 140) that transmits notification information that notifies the user device of timer values to be used for monitoring the radio link in the reduced level. The notification information transmitting unit notifies the user device of the timer values specified for a part of the reduced levels that differ from timer values specified for the reference reception power level.

According to still another aspect of the present invention, a radio base station (eNB 100) capable of being set in a first mode that sets a radio link with a user device based on a reference reception power level of a radio signal received by the user device, and a second mode that sets the radio link based on any one among a plurality of reduced levels having gradually reduced reference reception power levels than the reference reception power level used in the first mode, includes an individual information transmitting unit (an individual information transmitting unit 150) that transmits to the user device individual information that is dedicated to the user device. The individual information transmitting unit transmits to the user device the individual information that includes timer values to be used for monitoring the radio link in the reduced level. The individual information includes the timer values specified for a part of the reduced levels that differ from timer values specified for the reference reception power level.

As described above, the details of the present invention have been disclosed by using the embodiment of the present invention. However, the description and drawings which constitute part of this disclosure should not be interpreted so as to limit the present invention. From this disclosure, various alternative embodiments, examples, and operation techniques will be easily apparent to a person skilled in the art.

The entire contents of Japanese Patent Application 2015-217958 (filed on Nov. 5, 2015) are incorporated in the description of the present application by reference.

INDUSTRIAL APPLICABILITY

According to the user device and the radio communication method explained above, even if the enhanced coverage mode is in operation, radio link failure (RLF) can be appropriately detected.

EXPLANATION OF REFERENCE NUMERALS 10 radio communication system
20 radio access network
100 eNB
110 CE level setting unit
120 reception quality threshold retaining unit
130 timer value retaining unit
140 notification information transmitting unit
150 individual information transmitting unit
160 radio communication unit
200 UE
210 notification information receiving unit
220 individual information receiving unit
230 CE level setting unit
240 radio link monitoring unit
250 radio communication unit

The invention claimed is:

1. A user device being configured to set in a first mode that sets a radio link with a radio base station based on a reference reception power level of a radio signal transmitted from the radio base station, and a second mode that sets the radio link based on one of a plurality of reduced levels supported by the radio base station and having gradually reduced reference reception power levels than the reference reception power level used in the first mode, the user device comprising:
 a processor coupled to a memory that sets, when the user device is set in the second mode, a reception quality threshold of the reference reception power level specified for a maximum reduced level among the plurality of reduced levels supported by the radio base station,
 wherein the processor executes monitoring of the radio link based on the reception quality threshold, and
 wherein, when the user device is in the second mode and executes a reduced level that is different from the maximum reduced level supported by the radio base station, the processor sets the reception quality threshold specified for the maximum reduced level supported by the radio base station.

2. A user device being configured to set in a first mode that sets a radio link with a radio base station based on a reference reception power level of a radio signal transmitted from the radio base station, and a second mode that sets the radio link based on one of a plurality of reduced levels having gradually reduced reference reception power levels than the reference reception power level used in the first mode, the user device comprising:
 a processor coupled to a memory that measures the reference reception power level that corresponds to the reduced level,
 wherein the processor sets, when the user device is set in the second mode, a reception quality threshold of the measured reference reception power level, the reception quality threshold being specified for a maximum reduced level among the plurality of reduced levels supported by the radio base station,
 wherein the processor measures a reception power level of the radio signal, and executes monitoring of the radio link based on the reception quality threshold, and wherein, when the user device is in the second mode and executes another or the other reduced level that is different from the maximum reduced level, corresponding to the measured reception power level and for which the reception quality threshold is specified, the processor sets the reception quality threshold specified for the maximum reduced level corresponding to the measured reception power level measured by the processor regardless of a reduced level set for the user device.

* * * * *